MULTIBEAM COLOR TUBE REGISTRATION SYSTEM

Filed Nov. 22, 1954 3 Sheets-Sheet 1

INVENTOR.
George C. Sziklai
BY
[signature]
ATTORNEY

MULTIBEAM COLOR TUBE REGISTRATION SYSTEM

Filed Nov. 22, 1954 3 Sheets-Sheet 2

INVENTOR.
George C. Sziklai
BY
[signature]
ATTORNEY

MULTIBEAM COLOR TUBE REGISTRATION SYSTEM

Filed Nov. 22, 1954 3 Sheets-Sheet 3

INVENTOR.
George C. Sziklai
BY
[signature]
ATTORNEY

United States Patent Office 2,892,020
Patented June 23, 1959

2,892,020

MULTIBEAM COLOR TUBE REGISTRATION SYSTEM

George C. Sziklai, Princeton, N.J., assignor to Radio Corporation of America, a corporation of Delaware Application November 22, 1954, Serial No. 470,249
12 Claims. (Cl. 178—5.4)

The present invention relates to new and improved color television image reproduction apparatus and, particularly, to apparatus of the type employing a cathode ray tube of the so-called horizontal "line screen" variety.

Among the forms of color television image reproducing apparatus proposed thus far is one which includes a cathode ray kinescope having a target screen made up of a plurality of groups of strip-like elements adapted to emit light of respectively different colors in response to electron beam impingement. In the case of such a tube, means are provided for causing a plurality of electron beam components to scan a raster pattern on the screen, the raster comprising a plurality of horizontal line scans separated from each other vertically but being in the direction parallel to the groups of strip-like elements. Means are provided additionally, as a practical matter, to insure tracking of the groups of color elements by the electron beam components in an orderly sequence so that the video signals representative of the respectively different component colors of the image being televised are actually employed in controlling the intensity of the beam component intended to illuminate a given color-producing element. Such means, which may be considered as partaking of the nature of a servo-mechanism may employ, for example, special elements (e.g., ultra violet emitting material) associated with the target screen for sensing the vertical position of the beam components and for providing indications thereof and means responsive to such indications for correcting the vertical position of the beam components with respect to the screen.

One problem which had been encountered in tubes of the type in which tracking depends upon the intensity of a tracking index signal is that of "cross talk" between the video picture content and the indexing information derived from the ultra-violet strips. Cross talk is caused, in general, by the fact that a kinescope's light-output-versus-signal-input characteristic is non-linear, so that a given amount of signal input near the cutoff of the kinescope produces a much smaller light output than does the same amount of signal near the saturation point. As will be appreciated, therefore, the operation of tracking circuits has been dependent, in part, upon the brightness of the television image.

It is, therefore, a primary object of the present invention to provide new and improved color image reproduction apparatus of the horizontal line screen tube variety, which apparatus includes means for effectively eliminating the effect of video signal content upon the operation of tracking control circuits.

Another and more specific object hereof is that of providing novel color image reproducing apparatus of the type in question, including means for cancelling the effect of video signal content upon the operation of tracking control circuits.

In general, the present invention provides color image reproducing apparatus which includes a kinescope having means for directing a plurality of electron beam components toward a luminescent screen made up of a plurality of groups of strip-like elements such as phosphor strips which are adapted to emit light of respectively different colors upon electron impingement. Associated with the groups of strip-like elements are tracking index signal-producing element (e.g., ultra-violet light-emitting material) which are arranged in a regular, repetitive pattern and in a fixed relationship with respect to the strip-like elements of a given color and which produce beam-position index signals when scanned by a beam component. Means responsive to the tracking index signals are included for causing the beam components to scan along predetermined paths. Two of the beam components bear the same video information and scan strips of the same color characteristic (e.g., red), while the other two are modulated by respectively different color video signals and scan respectively different color phosphor strips. The indexing elements are disposed with respect to the phosphor strips of the duplicated color in a symmetrical fashion such that an indexing element is adjacent each such phosphor strip. Tag signal frequencies higher than those of the video frequencies but differing in a characteristic such as phase or frequency are applied to the two beams adapted to scan the duplicated color phosphors. By virtue of the fact that both beams used in the "tracking" function are modulated by the same video signals, the effect of image brightness is cancelled, insofar as the accuracy of the derived beam tracking information is concerned. As will be more readily apparent hereinafter, the use of diplicated phosphor strips permits doubling of the light output of the tube.

It should be borne in mind that, as used herein, the term "beam components" may refer to either a plurality of electron beams produced by a plurality of electron guns or to a plurality of beams formed from a single source of electrons by a suitable lens arrangement.

Additional objects and advantages of the present invention will become apparent to persons skilled in the art from a study of the following detailed description of the accompanying drawing, in which.

Figures 1, 2:
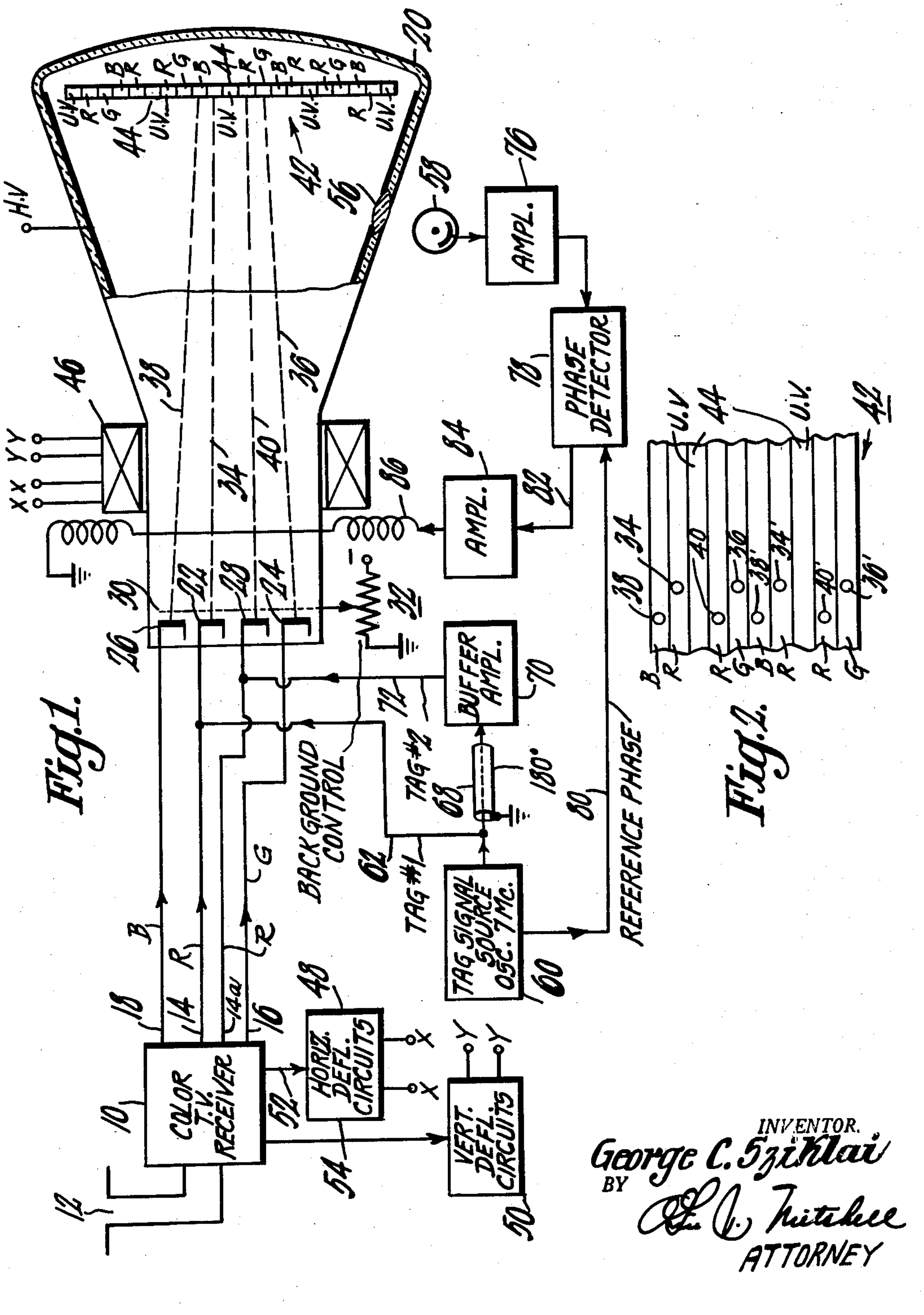
Fig. 1 illustrates, by way of a block diagram, a color television receiver embodying one form of the invention.
Fig. 2 is an enlarged, fragmentary view of the luminescent screen of the apparatus of Fig. 1.

Referring to the drawing and, particularly, to Fig. 1 thereof, there is shown a color television receiver 10 adapted to receive composite television signals which are intercepted by an antenna 12. Since the form of signals and the receiver required to operate thereupon do not constitute a part of the present invention, it is sufficient to note that the receiver 10 provides at its output terminals 14, 16 and 18, simultaneous video signals representative, respectively, of the instantaneous brightness values of the red, green and blue content of the television subject. Such video signals are produced initially by the scansion of a subject in a line-by-line and field-by-field manner, means being provided for deriving separate video signals respectively indicative of the selected component colors of the subject. By way of example, the receiver 10 may be adapted to process signals of the variety standardized by the Federal Communications Commission on December 17, 1953. Circuitry suitable for deriving simultaneous red, green and blue signals may be found, for example, in the book entitled "Practical Color Television for the Service Industry," revised edition April 1954, second edition, first printing, published by the RCA Service Company, Inc., a Radio Corporation of America subsidiary.

The selected component color signals are applied in the following manner to a color image reproducing kinescope 20: The red signal lead 14 is connected to the cathode 22 while the green and blue signal leads are respectively connected to the cathodes 24 and 26. A fourth cathode 28 is also provided with red video signals identical to those applied to the cathode 22 via a signal lead 14*a*. A control electrode 30, which may be common to all four cathodes, is connected adjustably to a potentiometer 32 which serves to set the D.-C. bias on the tube as a background control, in a well-known manner. The cathodes 22, 24, 26 and 28 produce, respectively, electron beams 34, 36, 38 and 40 which are directed toward a target screen 42 made up of a plurality of groups of horizontally disposed phosphor strips adapted to emit red, green and blue light in response to electron beams impingement. Indexing elements in the form of strips 44 of ultra-violet light-emitting phosphor material are associated with the color phosphor strips in a symmetrical fashion. That is to say, each group of color phosphor strips includes the phosphors B, R, R, G. An ultra-violet strip 44 is disposed between the first and second red phosphor strips R of each group. The arrangement of color and ultra-violet phosphors of the screen 24 may be better understood from the showing of Fig. 2 which also illustrates the luminescent spots produced by the beams 34, 36, 38 and 40. These beam spots, in the interest of simplicity, are designated by the same reference numerals as those which indicate the electron beams producing the spots. As will be understood from Fig. 2, therefore, during a given television field the phosphor strips B, R, R and G which are successively arranged in the screen 42 are illuminated by the beam spots 38, 34, 40 and 36.

The beams are caused to scan a raster made up of a plurality of vertically displaced horizontal line scansions by means of electromagnetic deflection fields produced by a conventional yoke 46 which is supplied with horizontal and vertical sawtooth currents from the circuits 48 and 50, respectively. The deflection circuits 48 and 50 are caused to operate at television line and field frequencies (viz. 15,750 c.p.s. and 60 c.p.s.) by means of synchronizing signals derived from the received signals and applied to the deflection circuits via the leads 52 and 54.

A window 56, transparent to ultra-violet light, is provided in the conical portion of the kinescope 20 so that ultra-violet light from the strips 44 resulting from electron impingement may pass to a light-responsive photocell device 58.

Tag signals useful in causing the electron beams to track the phosphor strips in the desired manner are applied to the "red" beams 34 and 40 as follows: A source of tag signal frequency which may take the form of a free-running oscillator 60 producing a continuous 7 megacycle wave is provided. One phase of the 7 megacycle wave from the oscillator 60, which will be understood as constituting tag signal No. 1 is applied via a lead 62 to the cathode 22 of the kinescope. In this manner, the tag signal No. 1, having a certain phase, is applied to electron beam 34. The wave produced by oscillator 60 is shifted in phase by 180°, as through the agency of an accurately cut delay line 68, and applied via a buffer amplifier 70 to a lead 72 which is connected to the cathode 28. The electron beam 40 is thus modulated at a 7 megacycle rate by tag signal No. 2 which is of the opposite phase from tag signal No. 1.

As the beams scan horizontally across the screen 42, illuminating the phosphor strips as shown by the beam spots in Fig. 2, any vertical displacement of the beams from their normal position will produce an increase in the ultra-violet light received by the photocell 58. That is, assuming that the beams, as by reason of scanning non-linearity, erroneously move upwardly from their normal position, the electron beam 40, modulated by tag signal No. 2 will impinge more upon the ultra-violet strip 44 just above it, while the beam 34 will impinge less upon the same ultra-violet strip which is just below it. Hence, the amount of ultra-violet light modulated by tag signal No. 2 and received by the photocell 58 will increase in amplitude, while the ultra-violet light modulated by tag signal No. 1 will be correspondingly decreased in amplitude. This fact is represented by the electrical indications provided by the output current of the photocell 58 and is amplified by a circuit 76 prior to application to a phase detector 78. A version of the tag signal frequency of fixed phase is applied from the oscillator 60 via a lead 80 to the phase detector 78, so that the latter circuit may provide at its output lead 82 a direct current signal whose polarity and amplitude are, respectively, indicative of the direction and amount by which the photocell signal is out of phase with respect to the reference phase. The direct current correction signal, from the phase detector 78 is amplified by a circuit 84 and applied to an auxiliary vertical deflection winding 86 such that the current caused to flow through the winding 86 produces a magnetic field designed to deflect the beams downwardly to their proper positions.

Assuming, on the other hand, that the beams erroneously move downwardly from their proper positions, the ultra-violet light received by the photocell 58 will bear more of the tag signal No. 1 than the tag signal No. 2. The phase detector 78 will then be operative to provide a direct current which, when passed through the winding 86, will cause corrective re-positioning of the beams upwardly.

Figures 3, 6, 7, 8:
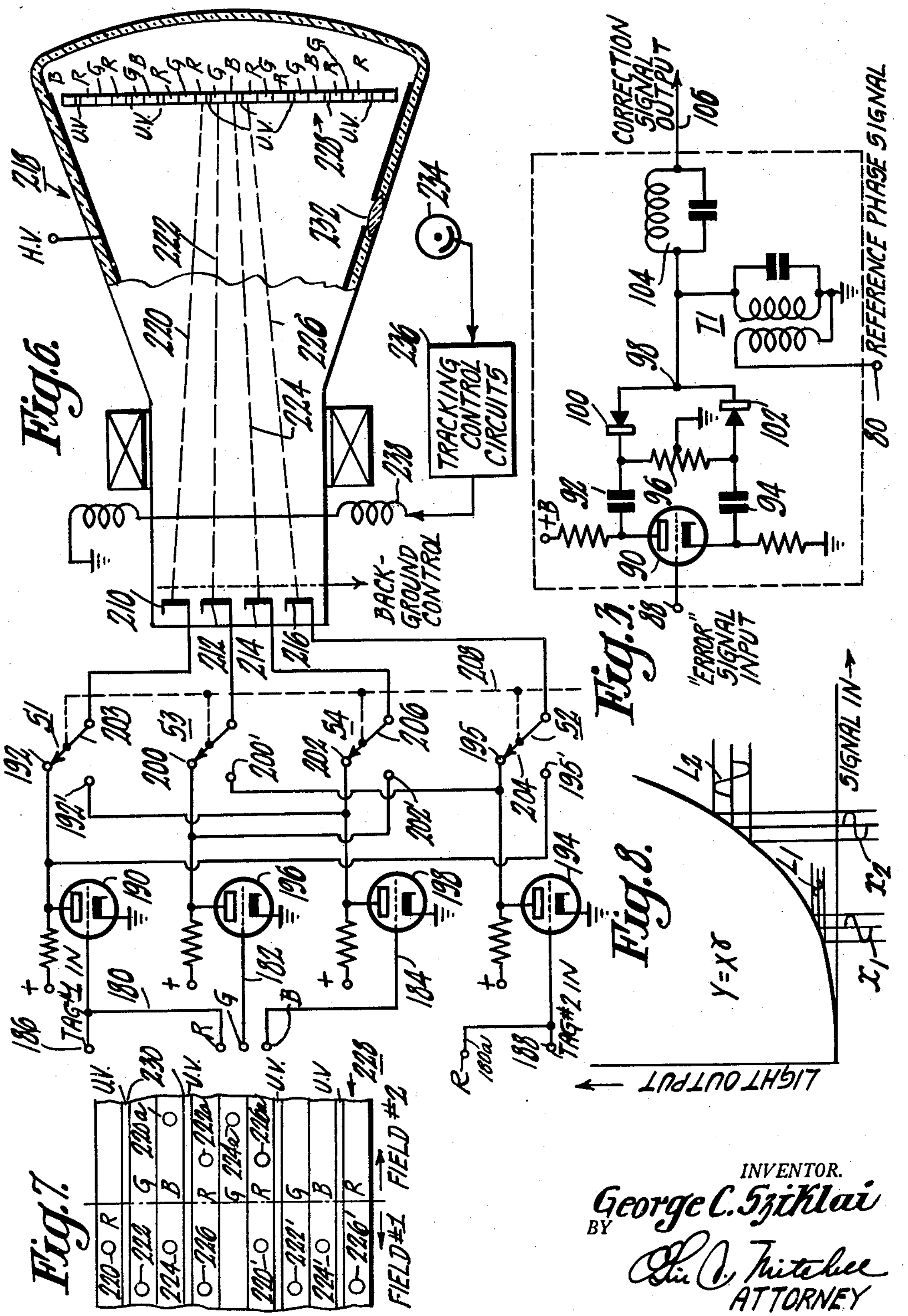
Fig. 3 is a schematic diagram of a circuit useful in performing certain of the functions indicated in Fig. 1.
Fig. 6 illustrates, by way of block and schematic diagram, still another form of the invention.
Fig. 7 is an enlarged, fragmentary view of the luminescent screen employed in the apparatus of Fig. 7.
Fig. 8 is a curve illustrative of the dynamic transfer characteristic of a kinescope.

While tracking circuits of the type described thus far are known in the art, circuitry suitable for performing the phase detection function of the block 78 is illustrated schematically in Fig. 3. In Fig. 3, the "error" signal derived from the photocell 58 and amplified by the circuit 76 is applied to the signal input terminal 88 of a phase-splitter 90 so that opposite phases of the error signal are applied via the capacitors 92 and 94 across the two halves of a resistance 96 which is center-tapped to ground, as shown. The reference tag phase signal from the lead 80 is shifted in phase by 90° through the agency of the transformer $T_1$ and applied to the terminal 98. Depending upon the relative phases of the reference signal and the error signal, one of the two oppositely polarized diodes 100 and 102 will conduct more heavily than the other, thereby providing a direct current voltage at the terminal 98 whose polarity and amplitude are, respectively, indicative of the direction and amount by which the error signal differs in phase from the reference signal. This output voltage or "correction" signal is applied via a resonant circuit 104, which serves to trap out undesired video frequencies, to the output terminal 106 which is adapted for connection to the winding 86.

In accordance with the apparatus of Figs. 1, 2 and 3 as thus far described, the beams 34, 36 and 40 will be caused to scan along the horizontally disposed phosphor strips of the screen 42 as shown in Fig. 2 during a given line scansion. During the next succeeding line scansion of that television field, the beams will scan the next group of phosphor strips B, R, R and G as shown with the spots 38′, 34′, 40′ and 36′. As will be seen, therefore, during each horizontal scansion of the screen, the two red phosphor strips R and each of the green and blue strips G and B of a group will be illuminated.

The significance of the fact that two phosphor strips of the same color characteristic are simultaneously scanned during a given television line interval by beams bearing identical video information but additionally modulated by mutually distinct tag signals, will now be explained. In tracking arrangements for horizontal line screen color kinescopes in which a beam is modulated by a tag signal in addition to its video modulation, the amplitude of the derived tracking index signals from the ultraviolet or other index signal producing elements is variable as a function of the D.-C. component of the video image. Referring to Fig. 8 which illustrates the dynamic transfer characteristic of a typical kinescope (signal-output-versus-signal-input), it is seen that the transfer characteristic of such a tube approximates a power law function, as shown by the relationship $Y=X^{\gamma}$. Thus, for a scene having a low average brightness level (i.e., D.-C. component) as indicated by the D.-C. axis $x_1$, the light output is relatively small in amplitude, as shown by the output curve $L_1$. On the other hand, where the average scene brightness is high so that the D.-C. axis of the signal is at $x_2$, the light output $L_2$ is appreciably larger, by reason of the greater slope of the characteristic curve. With the foregoing in mind, it will be understood that the amplitude of the ultra-violet light index signal also increases as a function of the video signal also increases as a function of the video signal D.-C. Where, as in apparatus of the type shown in Fig. 1, a tracking control circuit function in accordance with the amplitude of a tracking index signal, a single beam component used in performing the tracking function is objectionably affected by the video signal content in that the tracking index signal is larger when the brightness of the televised scene is increased.

By reason of the use of two beam components modulated by the same video signals and bearing mutually distinct tracking signals, the effect of video signal content is cancelled and the tracking function is unimpaired. Stated otherwise, if it be assumed that the scene being reproduced is predominantly red and of relatively high brightness level, both of the "red" beams 34 and 40 will produce increased amplitude tag signals in the photocell 58 and the amplitudes will remain equal so long as the beams are properly equally spaced with respect to the ultraviolet strip 44.

Figures 4, 5:
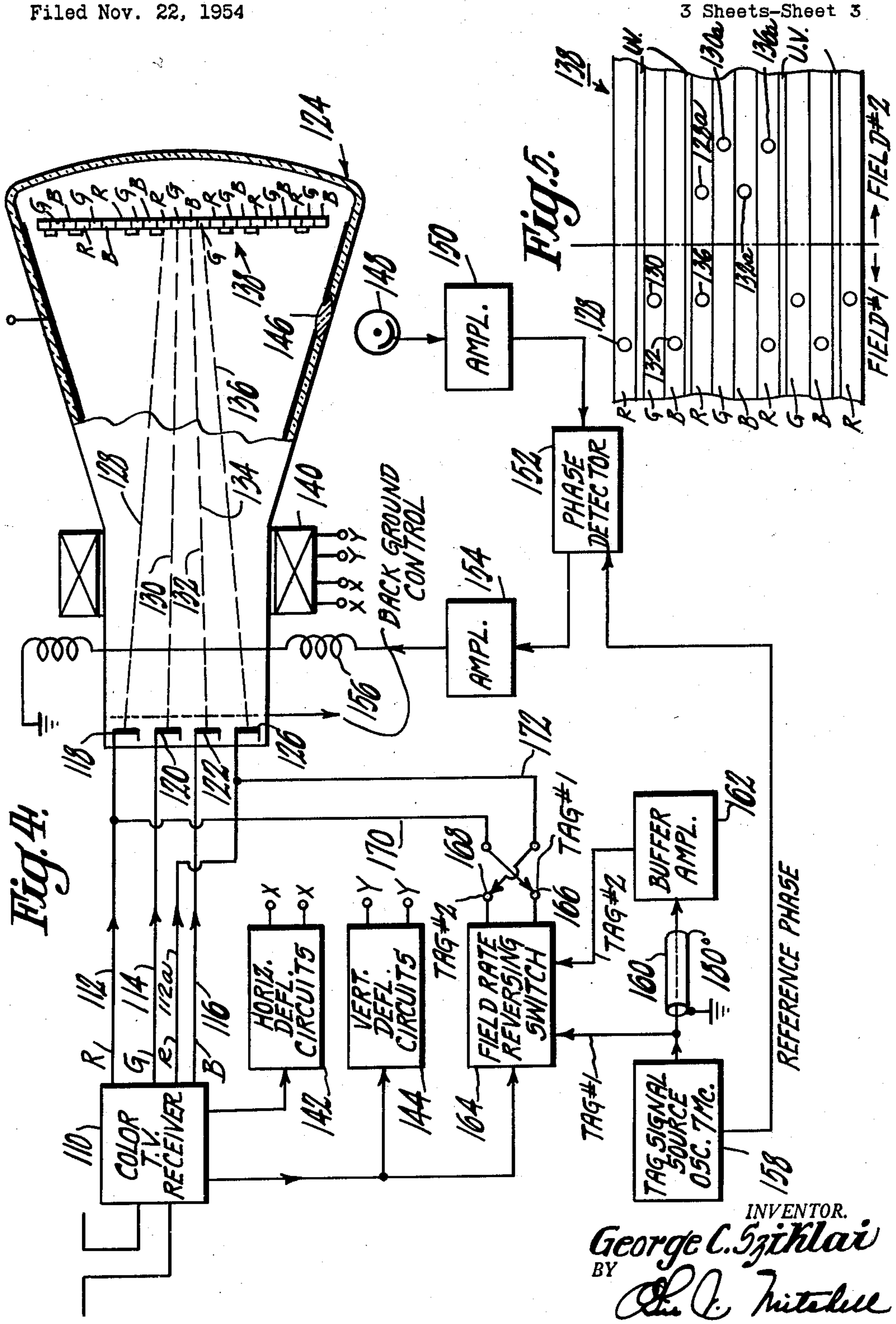
Fig. 4 is a block and circuit diagram illustrative of another form of the invention.
Fig. 5 is an enlarged, fragmentary view of the luminescent screen of Fig. 5.

Fig. 4 illustrates another form of color image reproducing apparatus embodying the principles of the present invention. In Fig. 4, red, green and blue simultaneous video signals are applied by a receiver 110 to leads 112, 114 and 116. These signal leads are connected, respectively, to the cathodes 118, 120 and 122, respectively, of a kinescope 124. A fourth cathode 126 is also provided with the red video signals from the lead **112*a*. Electron beams 128, 130, 132 and 136 are produced by the cathodes and are directed toward a screen 138. The beams are caused to scan the screen in raster fashion by means of the action of a deflection yoke 140 operated by the circuits 142 and 144 which are synchronized by signals from the receiver. The screen 138** is better seen in Fig. 5 and includes groups of color and ultra-violet light-producing phosphor strips arranged in the following sequence: R, U.V., G, B, U.V., R and G.

A window 146, transparent to ultra-violet light, permits such light to pass to a photocell 148 whose output signal is amplified by a circuit 150 and applied to a phase detector 152. The output signal of the phase detector, to be described more fully, is applied through an amplifier 154 to a vertical position-correcting winding 156. As in the case of the apparatus of Fig. 1, the red electron beam components are modulated by tracking tag signals No. 1 and No. 2. Both tag signals may be of the same frequency but of different phase and are illustrated as being produced by an oscillator 158 which provides tag signal No. 1 and a delay line 160 which derives tag signal No. 2 of the opposite polarity from the first tag signal. Tag signal No. 2 is applied via a buffer amplifier 162 to one of the input terminals of a television field-rate reversing switch 164 and tag signal No. 1 is applied to a second input terminal of the switch. The output terminals 166 and 168 of the switch 164 are connected via leads 170 and 172 to the cathodes 118 and 126, respectively. Thus, during a first television field, the beams produced by the cathodes 118 and 126 will be modulated by tag signals No. 1 and No. 2, respectively, in addition to the red-representative video signals. A reference phase of the tag signal is applied via the lead 174 to the phase detector 152.

In the operation of the apparatus of Fig. 4 as thus far described, it will be understood that, during the television field in question, the electron beams will produce, during a first line scansion, beam spots 128, 130, 132 and 136. If the beams were to be moved upwardly erroneously, there would be provided by the photocell 148 an increased amount of ultra-violet light modulated by tag signal No. 2, in response to which the phase detector would pass a current through the winding 156 of such polarity and magnitude as to move the beams downwardly to their correct positions. The reverse action would occur in the event of erroneous downward shifting of the beams with respect to the ultra-violet strips. Such beam tracking action is, moreover, substantially unaffected by and independent of the brightness of the television scene, since both of the beams 128 and 136 are equally affected as to intensity by the video content.

In the interest of completeness of description, it may be noted, although it forms no part of the present invention, that the apparatus of Fig. 4 provides for vertical interlace of successive television field rasters. As explained in the co-pending U.S. application for patent, Serial No. 470,417, filed concurrently herewith by the present applicant, for "Color Image Reproduction Apparatus," vertical interlace may be automatically provided by reversing the sense of the two tag signals with respect to the reference phase at a field rate. That is to say, the switch 164, circuitry for which is disclosed in the cited application, is controlled by vertical synchronizing pulses from the receiver 110 and serves to reverse the connections of the leads 170 and 172 with the tag signal terminals 166 and 168, so that, during the second television field of a frame, the electron beams 128 and 136 are, respectively, modulated by tag signal No. 2 and tag signal No. 1. The effect of reversal of tag signals is shown in Fig. 5 as causing the beams to produce spots **128*a*, 130*a*, 132*a* and 136*a***, which spots are interlaced between the lines scanned during the first field. In the case of the second field, therefore, as well as during the first field, the beams bearing the tracking tag signals are modulated by the same color video signals and are equally affected by changes in video content, so that the tracking operation is not subject to variations as a result of changing picture material.

Still another form of the invention in which two of several electron beam components are modulated by the same color-representative video signals and by mutually distinct tag signals as illustrated in Fig. 6.

In the apparatus of Fig. 6, red, green and blue video signals are simultaneously provided at leads 180, **180*a*, 182 and 184 as by a color television receiver. A source of tag signals (not shown) which may, for example, be of the same nature as that illustrated in Fig. 1, provides at the terminals 186 and 188 tag signals No. 1 and No. 2, respectively. These tag signals may be considered as being opposite phases of a 7-megacycle sine wave, as in the case of Fig. 1. Tag signal No. 1 and the red video signal from lead 180 are applied to the control electrode of an electron tube 190 whose anode is connected to one terminal 192 of a switch $S_1$. Tag signal No. 2 and red video signals from the lead 180*a* are applied to the control electrode of a second electron tube amplifier 194 whose anode is connected to the stationary terminal 195 of a switch $S_2$. The green and blue video signals from leads 182 and 184 are applied, respectively, to the control electrodes of amplifiers 196 and 198** whose anodes are, respectively, connected to the stationary terminals 200 and 202 of switches $S_3$ and $S_4$. Switches $S_1$ through $S_4$ include, in addition to the stationary terminals thus far mentioned, terminals 192′, 195′, 200′ and 202′, respectively, and movable contact members 203, 204, 205 and 206. The movable contacts are ganged to each other as indicated by the dashed line 208 and are operated in unison by a field rate switch actuator which may, by way of illustration, comprise an electric motor operating a reciprocatory mechanism in synchronism with television vertical synchronizing pulses derived from the receiver. That is to say, during a first television field, the movable contact members will be in contact with the upper stationary terminals.

The movable contact members 203, 204, 205 and 206 are connected, respectively, to the cathodes 210, 212, 214 and 216 of a kinescope 218 having associated therewith means (not shown) for causing electron beams 220, 222, 224 and 226 to scan a raster on the screen 228. The screen 228 includes, as will be described more fully, index signal-producing ultra-violet strips 230 and a window 232 is provided for passing ultra-violet light from the strips to a photocell 234 whose output signal is used in controlling the tracking circuits 236 which operate in conjunction with a correction coil 238 to maintain the beams in their proper position with respect to the screen in the manner described above in connection with Figs. 1 and 4.

The screen 228 is illustrated more clearly in Fig. 7 and is made up of groups of horizontally disposed color and ultra-violet light-emitting phosphors, each group being made up in the following sequence: R, U.V. (ultra-violet), G, B, U.V., R, G.

With the switches $S_1$ through $S_4$ connected as shown in Fig. 6 and in contact with the upper stationary terminals, the electron beams 220, 222, 224 and 226 will produce spots bearing the same reference numerals as shown in Fig. 7. As will be understood, the beam 220 is intensity modulated by the red video signals and tag signal No. 1: the beam 226 is modulated by red video signals and tag No. 2 and the beams 222 and 224 are, respectively, modulated by the green-and-blue-representative video signals. Since the tracking control circuits 236 are operative in the same manner as the corresponding circuits of Fig. 1, it will be understood that, should the beams be moved downwardly from their proper position, the increased amplitude of tag signal No. 1 detected by the tracking control circuits will produce a current in the winding 238 designed to move the beams upwardly. Conversely, if the beams were to move upwardly from their desired position, the increased amplitude of tag signal No. 2 would cause the tracking control circuits to produce a current in the winding 238 for lowering the beams. During the second horizontal scansion of the same field, the beams would scan the strips R, G, B and R as indicated by the spots 220′, 222′, 224′ and 226′.

At the end of the first television field, the switch actuator 208, in response to the vertical synchronizing pulse from the receiver, will operate to move the contact members 198, 200, 202, 203, 204, 205 and 206 down and into contact, respectively, with the stationary terminals 192′, 195′, 200′ and 202′. These last-named terminals are, as shown, respectively, connected to the anodes of the tubes 198, 190, 194 and 196. Thus, during the second television field, the electron beams 220, 222, 224 and 226 are intensity modulated, respectively, by the blue, red+ tag No. 2, green and red+ tag No. 1 signals. The beams will, therefore, be caused to scan the screen 228 as shown by the beam spots *220a*, *222a*, *224a* and *226a*. The reason for the scanning position of the beams during field No. 2 is that the beam 222 is modulated by that tag signal which, when present in the tracking control circuits, produces a downward deflection of the beams by the winding 238 and that the beam 220 is modulated by that tag signal which, when present in the tracking circuits 236, causes the deflection correction winding to produce upward movement of the beams.

From the foregoing, it will be appreciated that the apparatus of Fig. 6 produces automatic interlace of the beams for successive television fields. During each of the fields of the interlaced frame shown in Fig. 7, the two electron beams which may be considered as being charged with the tracking function (i.e., those beams which are modulated by tag signals) are also modulated by the same color representative video signals, so that the apparatus of Fig. 6 affords the same advantage of eliminating cross talk between video signals and tracking information realized with the apparatus of Figs. 1 and 4.

It is to be noted that, by virtue of the fact that, during each horizontal scansion, two red phosphor strips are scanned at the same time that only one each of the green and blue strips is scanned, the light output of the kinescope in each of Figs. 1, 4 and 6 is substantially doubled over that which may be obtained with arrangements in which only one phosphor strip of each of the several colors is scanned during a line interval. This latter advantage may be understood from the fact that certain phosphor materials (e.g., red) are far less efficient than otherwise. In the case of presently available phosphors, the light output of a given red phosphor strip is approximately ⅓ that of a green phosphor strip for the same amount of input energy (i.e., electron beam current). Thus, it has heretofore been the practice to decrease the energization of the green and blue phosphors of a color kinescope in order to bring about the desired balance of the three reproduced colors. By reason of the doubled amount of red light output of the kinescope, the green and blue electron beams may be correspondingly increased in intensity, so that the total increase in light of the tube is substantially doubled.

Those skilled in the art will recognize that the present invention provides, in accordance with its several disclosed embodiments, novel means for producing automatic cancellation of the effect of video signal content upon the beam tracking function in an arrangement employing distinctive tag signals as a beam modulation component. While the invention has been described as employing tag signals comprising opposite phases of a single high-frequency wave, it will be understood that the tag signals may constitute other phases of a single wave or even separate frequencies higher than the video frequency range, in which last event frequency-discriminating circuits such as that disclosed in U.S. Patent No. 2,587,074, granted February 26, 1952, to the present applicant may be employed. Moreover, although the choice of which color phosphor strips are duplicated may be dictated by such considerations as relative phosphor efficiencies and the like, the principles of the present invention may be utilized with other selected color phosphors insofar as the elimination of cross talk is concerned. Also, while ultra-violet light-producing phosphor materials have been indicated as useful as the tracking index-signal-producing elements, it should be borne in mind that other indicia such as materials of high secondary electron emission characteristics may be used.

Having thus described my invention, what I claim as new and desire to secure by Letters Patent is:

1. A kinescope comprising a screen made up of a plurality of groups of strip-like elements having respectively different color characteristics, the strip-like elements of one color characteristic being present in the ratio of two to one with respect to at least the strip-like elements of one other color, and scanning-position index elements associated with said screen symmetrically with respect to the strip-like elements of one color characteristic, and means for producing and directing a plurality of electron beam component toward said screen, there being at least one beam component for each color characteristic and two beam components for said color characteristic present in the ratio of two to one with respect to another color.

2. The invention as defined by claim 1 wherein said means for producing electron beam components comprises means for producing a plurality of individual electron beams.

3. In combination with a multiple beam cathode ray tube having a target which includes scanning-position index elements and means for producing and directing first and second electron beams towards said target; means for causing said beams to scan across said target such that said first beam is adapted to travel above one of said elements while said second beam is adapted to travel below said element; means for modulating said first and second beams with substantially identical intelligence signals; and means for modulating said first and second beams with mutually distinct beam position tag signals; means for deriving index signals from said tube in response to impingement of said beams upon said index elements; and means for controlling the position of said beams in response to said index signal.

4. In apparatus which includes a cathode ray tube having a screen made up of a plurality of horizontally disposed strip-like elements of respectively different characteristics and means for directing a plurality of electron beam components toward said screen, said screen further having tracking index signal-producing elements associated with said screen in a fixed relationship with respect to certain of said strip-like elements and means responsive to signals from said index elements for controlling the position of said beam components; means associated with said cathode ray tube for modulating two of said beam components with substantially identical intelligence signals regarding the same characteristic of an image to be reproduced; and means for modulating said two beam components with mutually distinct tag signals.

5. Color television image-reproducing apparatus which comprises: a kinescope having a screen made up of a plurality of groups of strip-like elements having respectively different color characteristics; the strip-like elements of a first color characteristic being present in the ratio of two-to-one with respect to at least the strip-like elements of another color and scanning-position index elements disposed symmetrically with respect to the strip-like elements of said first color characteristic, and means for directing a plurality of electron beam components toward said screen, there being first and second beam components for said first color characteristic and one beam component for each of the other color characteristics; means for modulating said first and second beam components with the same video signal representative of said one color characteristic of an image to be reproduced; and means for applying mutually distinct tag signals respectively to said first and second beam components.

6. Color television image-reproducing apparatus which comprises: a color image-reproducing kinescope having a screen made up of a plurality of groups of horizontally oriented strip-like elements of respectively different preselected component colors and tracking index signal-producing elements associated with said strip-like elements in a regular repetitive pattern and in a fixed relationship with the strip-like elements of a certain color; and means for producing a plurality of electron beam components, at least one for each of such component colors; deflection means for causing said beam components to scan a raster on said screen, the lines of said raster being parallel to said strip-like components; means associated with said kinescope for modulating a first one of said beam components with a first tracking tag signal and a second one of said beam components with a second tracking tag signal distinct from said first tag signal; means for detecting tracking index signals produced by said tracking index signal-producing elements; means coupled to said detecting means for shifting the position of said beam components in accordance with such tracking index signals; a source of video signals respectively representative of said component colors; and means for coupling said source to said kinescope for modulating both of said first and second beam components with video signals representative of the same color.

7. Color television image-reproducing apparatus which comprises: a color image-reproducing kinescope having a screen made up of a plurality of groups of horizontally oriented strip-like elements of respectively different preselected component colors and tracking index signal-producing elements associated with said strip-like elements in a regular, repetitive pattern and in a fixed relationship with the strip-like elements of a certain color; and means for producing a plurality of electron beam components, at least one for each of such component colors; deflection means for causing said beam components to scan a raster on said screen, the lines of said raster being parallel to said strip-like components; means for modulating first and second ones of such beam components with mutually distinct first and second tracking tag signals; means for detecting tracking index signals produced by said tracking index signal-producing elements; means coupled to said detecting means for shifting the position of said beam components in accordance with such tracking index signals; a source of video signals respectively representative of said component colors; and means coupled to said source for modulating each of said first and second beam components with the video signals representative of said certain color.

8. Color television image-reproducing apparatus which comprises: a color image-reproducing kinescope having a screen made up of a plurality of groups of horizontally oriented strip-like elements of respectively different preselected component colors and tracking index signal-producing elements associated with said strip-like elements in a regular repetitive pattern and in a fixed symmetrical relationship with the strip-like elements of a certain color; and means for producing a plurality of electron beam components, at least one for each of such component colors; deflection means for causing said beam components to scan a raster on said screen, the lines of said raster being parallel to said strip-like components; means associated with said kinescope for modulating such beam components respectively with video signals representative of such pre-selected component colors of an image to be reproduced such that first and second ones of such beam components bear the same video signals representative of one color component of such image; means for modulating said first and second ones of such beam components additionally with mutually distinct first and second tracking tag signals; means for detecting tracking index signals produced by said tracking index signal-producing elements; and means coupled to said detecting means for shifting the position of said beam components in accordance with such tracking index signals.

9. Color television image-reproducing apparatus which comprises: a color image-reproducing kinescope having a screen made up of a plurality of groups of horizontally oriented strip-like elements having respectively different component color characteristics, the strip-like elements of a first color characteristic being present in the ratio of two-to-one with respect to the strip-like elements of another color and scanning position index elements disposed adjacent to the strip-like elements of said first color characteristic, and means for directing a plurality of electron beam components toward said screen, at least one beam component for each component color and first and second beam components for said first color characteristic; means for modulating said first and second beam components with the same video signal representative of said first color characteristic of an image to be reproduced; means for applying mutually distinct tag signals respectively to said first and second beam components; and deflection means for causing such beam components to scan successive rasters on said screen, the lines of the rasters being parallel to said strip-like elements 10. Color television image-reproducing apparatus which comprises: a color image-reproducing kinescope having a screen made up of a plurality of groups of horizontally oriented strip-like elements having respectively different component color characteristics, the strip-like elements of a first color characteristic being present in the ratio of two-to-one with respect to the strip-like elements of another color and scanning position index elements disposed symmetrically with respect and adjacent to the strip-like elements of said first color characteristic, and means for directing a plurality of elctron beam components toward said screen, at least one beam component for each component color; means for applying mutually distinct tag signals respectively to two of such beam components; means for modulating said two beam components with identical video signals representative of the same color characteristic of an image to be reproduced; deflection means for causing such beam components to scan successive rasters on said screen, the lines of the rasters being parallel to said strip-like elements; beam position detecting means responsive to the scansion of said index elements by such beam components to which said tag signals are applied; and means for shifting the position of such beam components in a direction normal to the direction of said strip-like elements in response to said detecting means.

11. Color television image-reproducing apparatus which comprises: a color image-reproducing kinescope having a screen made up of a plurality of groups of horizontally oriented strip-like elements of respectively different pre-selected component colors and tracking index signal-producing elements associated with said strip-like elements in a regular, repetitive pattern and in a fixed relationship with the strip-like elements of a certain color such that each of said index elements is adjacent to at least one strip-like element of said certain color; and means for producing a plurality of electron beam components, at least one for each of such component colors; deflection means for causing said beam components to scan a raster on said screen, the lines of said raster being parallel to said strip-like components; a source of video signals respectively representative of such pre-selected component colors of an image to be reproduced; means coupled to said source and to said kinescope for applying video signals respectively to said beam components as intensity-modulating signals and in such manner that two of such beam components are modulated by identical signals representative of the same color component of an image to be reproduced; and means coupled to said kinescope for modulating the intensity of said two beam components with mutually distinct tag signals of super-video frequency.

12. Color television image-reproducing apparatus which comprises: a color image-reproducing kinescope having a screen made up of a plurality of groups of horizontally oriented strip-like elements of respectively different pre-selected component colors and tracking index signal-producing elements associated with said strip-like elements in a regular, repetitive pattern and in a fixed relationship with the strip-like elements of a certain color such that each successive pair of strip-like elements of a certain color is symmetrical with respect to at least one of said index elements; and means for producing a plurality of electron beam components, at least one for each of such component colors; deflection means for causing said beam components to scan a raster on said screen, the lines of said raster being parallel to said strip-like components; a source of video signals respectively representative of such pre-selected component colors of an image to be reproduced; and means coupled to said source and to said kinescope for applying video signals from said source to said beam components as intensity-modulating signals such that first and second ones of said beam components are both modulated by the same signals representative of said certain color; and means for applying beam-position tag signals to said first and second beam components.

References Cited in the file of this patent

UNITED STATES PATENTS

| | | |
|---|---|---|
| 2,446,761 | Schroeder | Aug. 10, 1948 |
| 2,660,612 | Wood | Nov. 24, 1953 |
| 2,681,381 | Creamer | June 15, 1954 |
| 2,691,743 | Urtel | Oct. 12, 1954 |
| 2,771,503 | Schwartz | Nov. 20, 1956 |
| 2,792,521 | Sziklai | May 14, 1957 |